United States Patent [19]

Takeuchi et al.

[11] 4,364,373

[45] Dec. 21, 1982

[54] SOLAR COLLECTOR SYSTEM

[75] Inventors: Hirosato Takeuchi; Fumito Degawa; Toshio Mikiya, all of Tokyo, Japan

[73] Assignee: Nitto Kohki Co., Japan

[21] Appl. No.: 263,210

[22] Filed: May 13, 1981

[30] Foreign Application Priority Data

Oct. 24, 1980 [JP] Japan ................ 55-149168
Nov. 29, 1980 [JP] Japan ................ 55-168467

[51] Int. Cl.³ .................... F24J 3/02; F24F 9/00
[52] U.S. Cl. .................... 126/418; 126/443; 137/68 R
[58] Field of Search .......... 126/443, 442, 422, 418; 137/68 R, 69

[56] References Cited

U.S. PATENT DOCUMENTS

| | | | |
|---|---|---|---|
| 2,048,388 | 7/1936 | Johnsen | 137/68 R |
| 4,043,318 | 8/1977 | Pei | 126/443 |
| 4,121,566 | 10/1978 | Radenkovic | 126/422 |
| 4,186,726 | 2/1980 | Spencer | 126/444 |
| 4,232,655 | 11/1980 | Frissora | 126/443 |

FOREIGN PATENT DOCUMENTS 209821 1/1924 United Kingdom ............ 137/68 R

Primary Examiner—Samuel Scott
Assistant Examiner—G. Anderson
Attorney, Agent, or Firm—Lerner, David, Littenberg & Samuel

[57] ABSTRACT

A vacuum glass tube type heat collector tube with a substantially straight, double cylindrical construction is closed at its initially open end with an end cap having two or more separate ports for heat transmitting medium. A solar system unit is made up of a center conduit with two separate medium passages and a plurality of such heat collector tubes combined in a rib like arrangement with a valve mechanism arranged at every junction of the center conduit with the tubes which instantly closes upon accidental breakage of the associated tube. Easy drainage of the medium releaves the tubes from breakage due to medium freezing and instant closing of the valve upon tube breakage enables free replacement of the broken tube without any interception to the normal operation of the remaining part of the unit.

17 Claims, 10 Drawing Figures

Fig. 4
Fig. 6
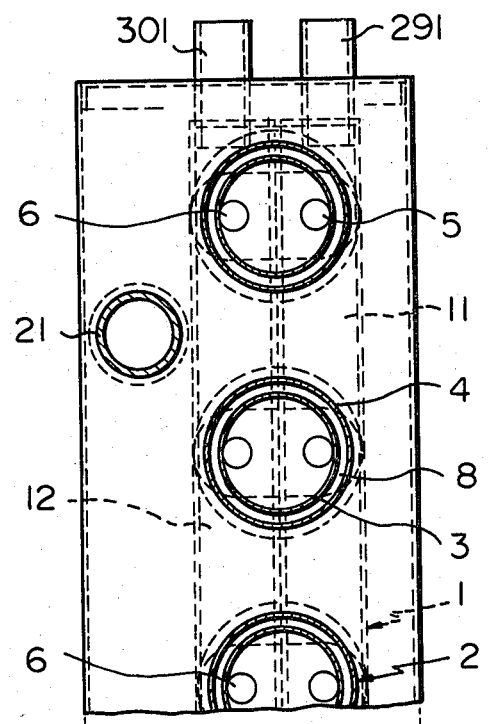
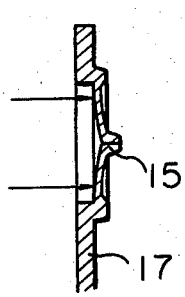
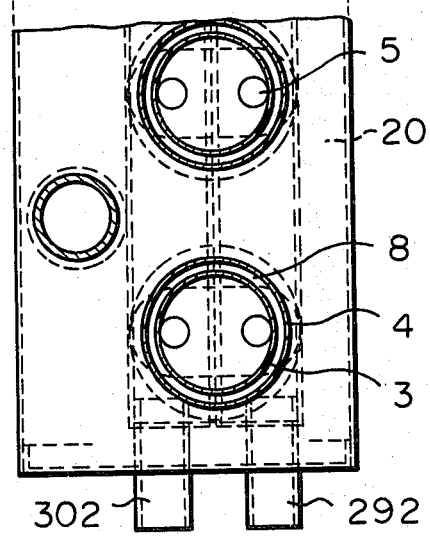

SOLAR COLLECTOR SYSTEM

BACKGROUND OF THE INVENTION

The present invention relates to a heat collector tube and a solar system unit, and more particularly relates to a vacuum glass tube type heat collector tube and a solar system unit including such a heat collector tube or tubes.

Solar system units including vacuum galss tube type heat collector tubes are classified in their mode of use into three significant groups. In the case of the first group, the medium to be heated is continuously supplied to the system and the medium heated by absorption of solar heat is continuously delivered from the system. This group accordingly employs one-way passage of the heat transmitting medium. In the case of the second group, the principle of thermo-syphon mechanism is utilized in which water rises due to its reduced specific gravity resulted from heating by absorption of solar heat. In the case of the third group, the heat transmitting medium is driven for compupulsory circulation through the system unit by a pump.

In the case of the first and second groups, the heat transmitting medium can easily be drained off the heat collector tubes and, consequently, there is no danger of accidental breakage of the heat collector tubes due to freezing of the medium. Since the heat collector tube used for the third group is closed at one end thereof, i.e. at the bottom end, some action needs to be taken in order to prevent breakage of the heat collector tube due to freezing of the heat transmitting medium. For example, the heat collector tubes have to be placed upside down when such freezing of the medium is expected. Despite such a disadvantage, the heat collector tube with a closed bottom end has been increasingly used in practice because of its high efficiency in solar heat collection. In order to meet such increased use of the heat collector tube with the closed bottom end, it is now strongly required to successfully prevent accidental breakage of the heat collector tube due to freezing of the heat transmitting medium.

Further, the vacuum glass tube is very fragile against external shock. In the case of any conventional solar system unit including such vacuum glass tubes, operation of the entire system unit has to be intercepted for replacement of broken heat collector tubes in order to prevent leakage of the heat transmitting medium at the junction of the broken heat collector tube to the system unit.

SUMMARY OF THE INVENTION

In accordance with the present invention, there is provided a solar collector system which includes a conduit having a pair of adjacent channels, each channel having a port. A solar collector tube extends generally laterally from the conduit. The solar collector tube includes an outer tube having an open end and a closed end, an inner tube having an open end and a closed end, the inner tube being arranged coaxially within the outer tube so as to form a space between the inner and outer tubes, and a cap positioned in the open ends of the inner and outer tubes. The cap includes a first passageway extending between the inner tube and the port of one of the channels and a second passageway extending between the inner tube and the port of the other channel, whereby fluid in the conduit may be supplied to the inner tube through the first passageway and then returned to the conduit through the second passageway. Controlling means controls the flow of fluid through the first and second passageways. The controlling means includes a pair of valves, one of which is continuously and resiliently urged towards a closed position in which it prevents fluid flow through the port of the one channel and the other of which is continuously and resiliently urged towards a closed position in which it prevents fluid flow through the port of the other channel. Moving means moves each of the valve members into an open position from its closed position. Because the moving means is disabled upon the breakage of the solar collector tube, the valve members automatically assume their closed positions to inhibit the leakage of fluid from the conduit in the event that the solar collector tube breaks.

In one embodiment of the present invention, the one valve member includes a first guide movably positioned in the port of the one channel, a first seal attached to the first guide for movement therewith between an open position in which the first seal is spaced from the port of the one channel and a closed position in which the first seal abuts the port of the one channel, and first urging means for urging the first seal towards its closed position. The other valve member includes a second guide movably positioned in the port of the other channel, a second seal attached to the second guide for movement therewith between an open position in which the second seal is spaced from the port of the other channel and a closed position in which the second seal abuts the port of the other channel, and second urging means for urging the second seal towards its closed position. In this embodiment, the moving means includes a free end of the cap and holding means for releasably holding the free end of the cap in engagement with the first and second guides to maintain the first and second seals in their open positions. Pushing means may also be provided for automatically pushing the free end of the cap away from the first and second guides upon the breakage of the solar collector tube.

In another embodiment of the present invention, the one valve member includes a first elastic seal having lips which are movable between closed positions in which they cooperate with each other to prevent fluid flow through the port of the one channel and open positions in which they are spaced apart from each other to permit fluid flow through the port of the one channel. The lips of the first elastic seal have an elastic memory sufficient to cause them to automatically assume their closed positions. The other valve member includes a second elastic seal having lips which are movable between closed positions in which they cooperate with each other to prevent fluid flow through the port of the other channel and open positions in which they are spaced apart from each other to permit fluid flow through the port of the other channel. The lips of the second elastic seal have an elastic memory sufficient to cause them to automatically assume their closed positions. In this embodiment, the moving means includes a free end of the cap and holding means for releasably holding the free end of the cap in engagement with the lips of the first and second elastic seals to maintain the lips in their open positions. Pushing means may also be provided for automatically pushing the free end of the cap away from the lips of the first and second elastic seals upon the breakage of the solar collector tube.

DESCRIPTION OF THE DRAWINGS

FIG. 4 is a section taken along the line IV—IV in FIG. 1, FIG. 6 is a sectional side view of the elastic valve in the closed state used for the construction shown in FIG. 5.

DESCRIPTION OF THE PREFERRED EMBODIMENTS

Figure 1:
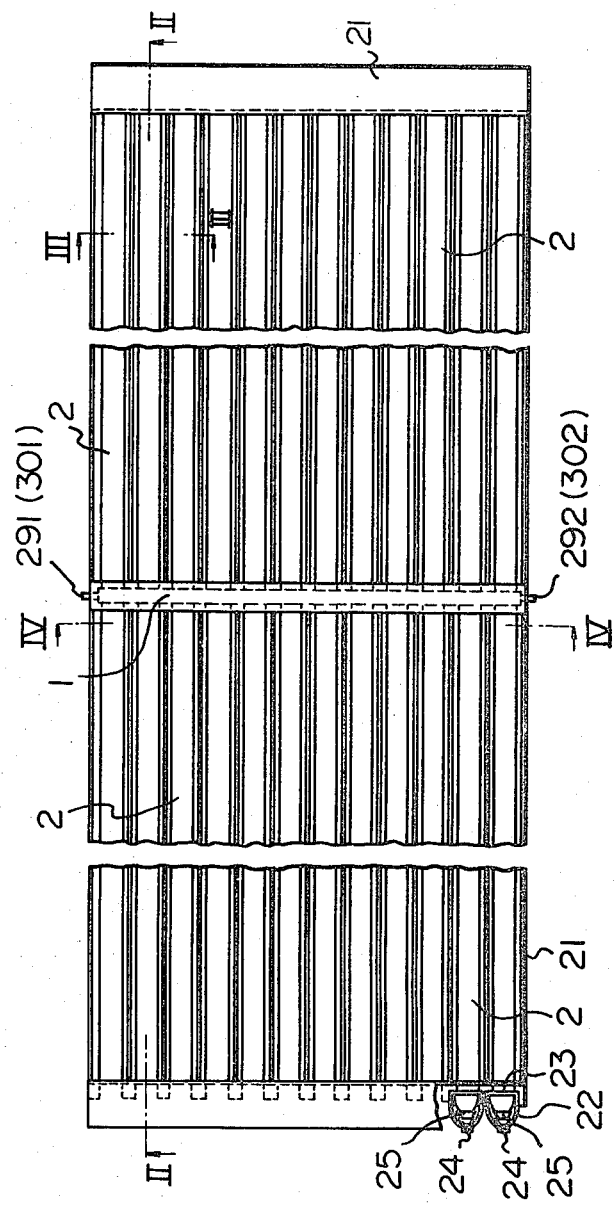
FIG. 1 is a plan view of one embodiment of the solar system unit in accordance with the present invention.

In the following description, elements used for different embodiments but substantially common in construction and function are indicated with same reference numerals.

One embodiment of a unit of the solar system in accordance with the present invention is shown in FIG. 1, in which the unit includes a center conduit 1 for the medium flow arranged about the center of the unit construction. The conduit 1 is provided with an inlet port for the medium to be heated and an outlet port for the medium heated. On either sides of the conduit 1, twelve sets of solar heat collector tubes 2 for each side are arranged at substantially equal intervals, which are coextensive with and extend substantially at a right angle with respect to the center conduit 1.

Figure 2:
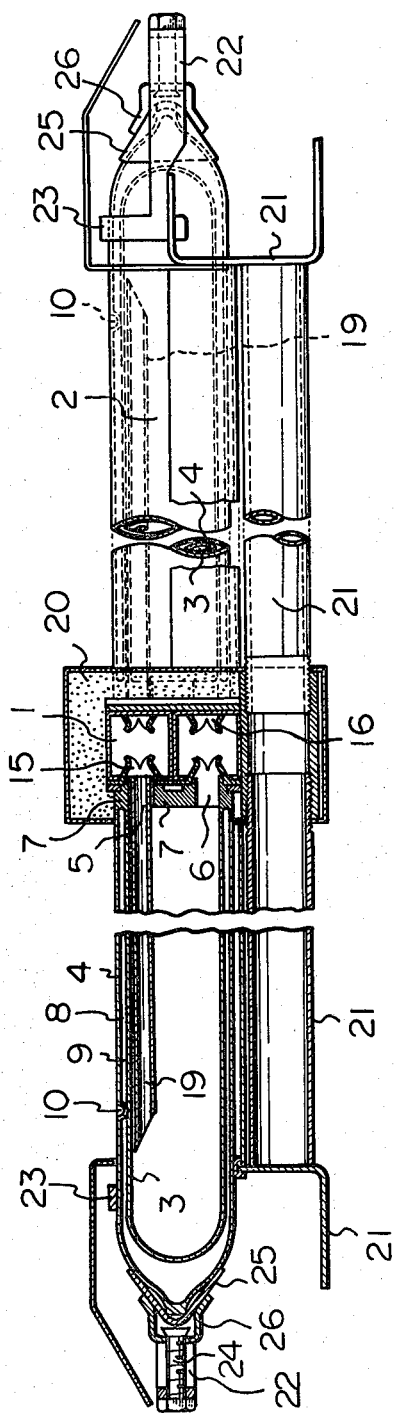
FIG. 2 is a section taken along the line II—II in FIG. 1.
Figure 5:
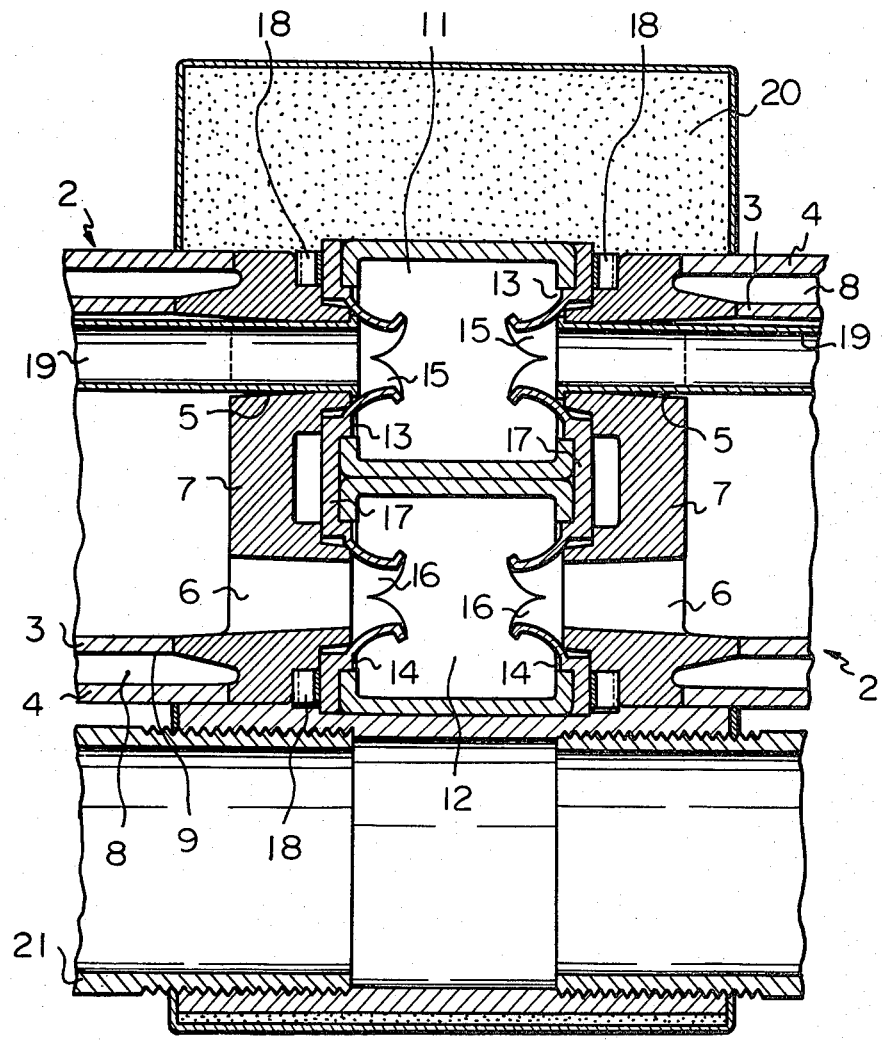
FIG. 5 is an enlarged transverse cross sectional view of one embodiment of the construction for connecting the center conduit to each pair of collector tubes used for the solar system unit shown in FIG. 1.

One embodiment of the construction for connecting the center conduit 1 to a pair of aligned collector tubes 2 is shown in FIG. 2, and more in detail in FIGS. 4 and 5. The collector tube 2 includes a pair of transparent glass tubes 3 and 4 of different diameters which are closed at on ends and arranged coaxially with each other. The other ends of the glass tubes 3 and 4 are covered air tight with a glass cap 7 which is provided with a pair of through holes 5 and 6 prescribedly spaced from each other. Thus a closed cylindrical space 8 is formed between the two glass tubes 3 and 4. By reducing the atmospheric pressure within the cylindrical space 8 in any known manner, a vacuum, double main tube is formed by the glass tubes 3 and 4. The outer surface of the inner glass tube 3 is covered with a selective light absorptive coating 9, which presents high absorption for short light waves and low emanation for heat waves.

Among the above-described two through openings 5 and 6 of the glass cap 7, one through hole 5 forms an inlet port and the other through hole 6 forms an outlet port for the medium used for the solar system of the present invention. Preferably, the holes 5 and 6 are arranged on a common diametrical line of the cap 7 and spaced as distant as possible. However, they may be arranged on a common secant of the cap 7. In accordance with the construction of the main tube made up of the glass tubes 3 and 4, however, the arrangement of the holes 5 and 6 in the glass end cap 7 may be designed quite freely.

In other to keep the spacing between the inner and outer glass tubes 3 and 4, the outer tube 4 is provided, near its initially closed end, with a plurality of small projections 10 which extend inwards in order to abut against the outer surface of the inner tube 3. Alternatively, like small projections may be made on the outer surface of the inner tube 3 in order to abut against the inner surface of the outer tube 4. Further alternatively, proper small springs may be interposed between the outer and inner glass tubes 3 and 4 in order to maintain the above-described spacing.

As shown in detail in FIG. 5, the center conduit 1 includes a pair of vertically juxtaposed passages 11 and 12, the upper passage 11 being for the medium to be heated and the lower passage 12 for the medium heated. The passages 11 and 12 are provided with 12 sets for each of side openings 13 and 14 so that each pair of side openings 13 and 14 meet the through holes 5 and 6 of the end cap 7 of each main tube made up of the glass tubes 3 and 4, respectively. Rubber cups 17 and leaf springs 18 are arranged at junctions between the side openings 13 and 14 and the through holes 5 and 6. The rubber cups 17 are provided with elastic valves 15 and 16 and made of a material highly resistant against weather and heat.

The elastic valves 15 open in the upper passage 11 for the medium to be heated whereas the elastic valves 16 open in the lower passage 12 for the medium heated. Under normal condition, the elastic valves 15 and 16 are closed as shown in FIG. 6. When insufficient force acts on the elastic valves 15 and 16 from the side of the heat collector tube 2, the valve 15 or 16 is forced to open as shown in FIG. 5 so that the passages 11 and 12 in the center conduit 1 have independent communication with the associated heat collector tube 2. The leaf springs 18 are arranged for automatic discommunication of the center conduit 1 from the heat collector tube 2, that is automatic closing of the elastic valves 15 and 16, when the the force exerted on the elastic valves 15 and 16 by the heat collector tube 2 has disappeared. More specifically, the leaf spring 18 causes instant and automatic separation of the heart collector tube 2 from the center conduit 1 when, for example, the heat collector tube 2 has been broken and, concurrently, instant and automatic closing of the elastic valves 15 and 16.

A pipe 19 is connected to the through hole 5 of the end cap 7, extends into the inner tube 3 and opens near the initially closed end of the inner tube 3 in order to conduct the medium to be heated from the upper passage 11 of the center conduit 1 into the inner tube 3 of the associated heat collector tube 2. The center conduit 1 is wholly mantled with a heat insulator 20.

Thus the heat collector pipes 2 are arranged in 12 tiers whilst extending sideways from and in communication with the center conduit 1 having the two juxtaposed passages 11 and 12. Such a rib construction is supported in a coextensive arrangement by a flat framework 21.

the initially closed end of each heat collector tube 2 is connected to the framework in the following manner.

Figure 3:
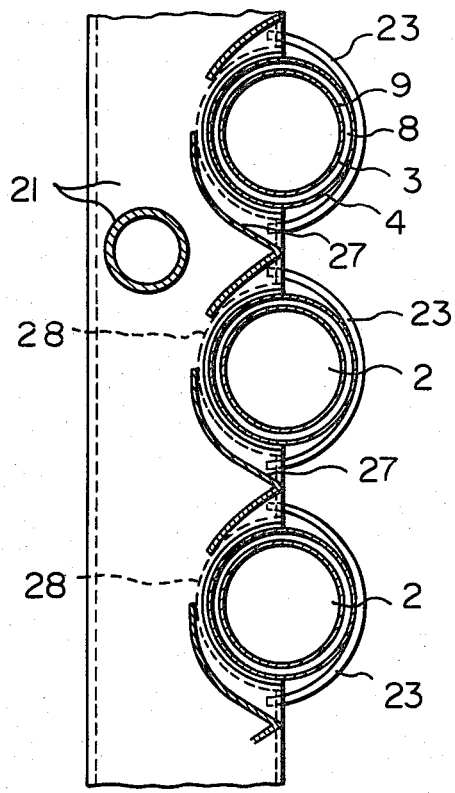
FIG. 3 is a section taken along the line III—III in FIG. 1.

As shown in FIGS. 2 and 3, a tube holder 22 is fixed to each side of the framework 21 near the initially closed end of each heat collector tube 2. The holder 22 includes a top arch section 23 in local contact with the top surface of the initially closed end of the heat collector tube 2, and a fastening screw 24 arranged at its outer end. The point of the screw 24 is accompanied with a supporter 26 which carries a conical cap 25 for accommodating the round initially closed end of the heat collector tube 2. By properly turning the fastening screw 24, the conical cap 25 is brought into pressure contact with the initially closed end of the heat collector tube 2 which is thereby held tight between the holder 22 and the center conduit 1 in order to maintain the rib construction shown in FIG. 1. Further, by adjusting the fastening screw 24, each heat collector tube 2 is movable longitudinally.

A proper spring mechanism may be used as a substitute for the fastening screw mechanism used in the illustrated embodiment.

A curved through 27 is arranged between adjacent heat collector tubes 2 whilst extending in parallel to and at least over the entire length of the heat collector tube 2. As shown in FIG. 3 the curved trough 27 spacedly covers the lower halves of the adjacent heat collector tubes 2 and functions as a sort of solar beam reflector. Curvature of the trough 27 is designed in consideration of the angles of incidence of the solar beam in summer and winter seasons. In order to avoid accumulation of rain water in the trough 27, a thin gap 28 is left between the adjacent troughs 27.

Figure 7:
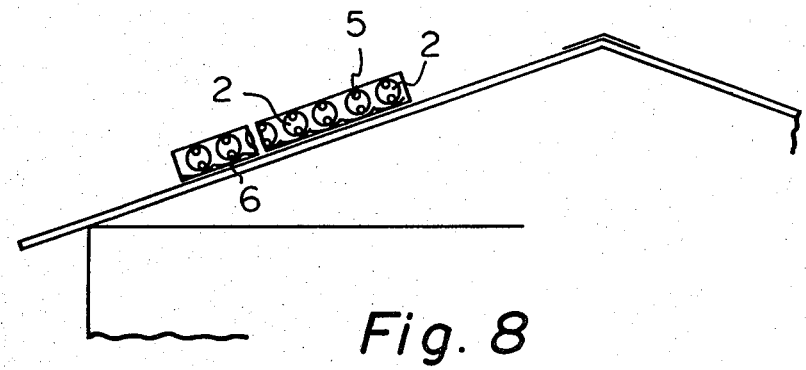
FIG. 7 is a side view of the solar system unit of the present invention placed on the roof of a house.
Figure 8:
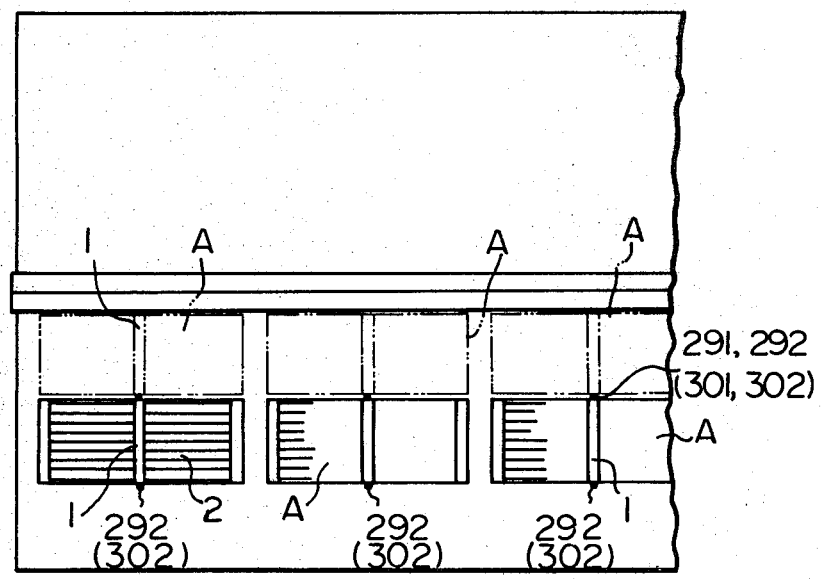
FIG. 8 is a plan view of a solar system made up of a number of solar system units in accordance with the present invention.

The solar system in accordance with the present invention is placed on the roof of a house as shown in FIGS. 7 and 8. A number of units A are arranged in a side-by-side relationship and medium taker-in tubes 291 and 292 of the adjacent units A are connected to each other by means of a proper coupling (not shown). Likewise, medium discharge tubes 301 and 302 of the adjacent units A are connected to each other by means of a proper coupling (not shown). As best seen in FIGS. 1 and 4, the tubes 291 and 301 are arranged on one end of the center conduit 1 in vertical alignment and the tubes 292 and 302 are arranged on the other end of the center conduit 1. The ends of the medium taker-in and discharge tubes 292 and 302 of the lowermost unit A of the solar system are closed so that the medium is introduced into the system from the upper side and flows back to the upper side from the lower side. That is, the madium circulates through the entire system. The medium taker-in and discharge tubes 291 and 301 of the terminal units A are connected to a reservoir of the heated medium (not shown) placed on the roof or the ground.

Circulation of the medium through the solar system in accordance with the present invention is carried out in the following fashion.

When the solar system of the invention is used for heating water, water is supplied to a water tank or reservoir located about the top of the roof. Then the cold water flows into the upper passage 11 of the center conduit 1 via the taker-in tube 291 of the unit A and is introduced into the inner tube 3 of the collector tube 2 via the elastic valve 15 and the pipe 19. The water so introduced into the heat collector tube 2 is heated by the solar heat transmitted through the outer and inner glass tubes 4 and 3 forming the main tube. Due to the high absorption for short light waves and low emanation for heat waves of the light absorptive coating 9 on the outer surface of the inner tube 3, more than 90% of the solar heat is effectively absorbed in order to heat the cold water in the inner tube 3 of the heat collector tube 2. As the water is heated by this solar heat absorption, hot water flows back to the tank or reservoir via the lower passage 12 of the center conduit 1 due to its reduced specific gravity. Water in the tank or reservoir again introduced into the system for like heating by solar heat absorption. More specifically, the moderately heated water contained in the inner tube 3 of the heat collector tube 2 flows into the lower passage 12 of the center conduit 1 via the hole 6 and the elastic valve 16 and further back to the water tank or reservoir via the madium discharge tube 301. Then water in the tank of reservoir including the moderately heated water flows into the upper passage 11 of the center conduit 1 via the medium taker-in tube 291 and further into the inner tube 3 of the heat collector tube 2 via the hole 5 and the elastic valve 15 for further heating by solar heat absorption. By such repeated circulation and heating, the temperature of water in the system of the present invention rises up to about 80° to 100° C.

The hot water so obtained can be either supplied for direct use or stored in the tank or reservoir for later use.

When any of the heat collector tubes 2 is broken, the solar system in accordance with the present invention operates as follows.

In accordance with the present invention, each heat collector pipe 2 is connected to the center conduit 1 via the elastic valves 15 and 16 which are normally closed but open when a sufficient force is applied thereto from the side of the heat collector tube 2. Consequently, when the outer and/or inner tube 4 (3) is broken, the force acting on the elastic valves 15 and 16 disappears. That is, when the outer tube 4 is broken, repulsion of the leaf spring 18 forces the end cap 7 to move towards the conical cap 25 and frees the elastic valves 15 and 16 from the force acting thereon. This causes instant closing of the elastic valves 15 and 16, thereby blocking leakage of water in the upper passage 11 of the center conduit 1. Thus the broken heat collector tube 2 is automatically excluded from the system and the remaining system retains its normal operation regardless of the broken heat collector tube in order to obtain hot water by solar heat absorption.

Replacement of a broken heat collector tube 2 of the solar system in accordance with the present invention is carried out as follows. Reverting to FIG. 2, the fastening screw 24 attached to the broken heat collector tube 2 is loosened in order to move the conical cap 25 from the initially closed end of the broken heat collector tube over a distance suited for insertion of a new heat collector tube. After insertion of the new heat collector tube 2, the fastening screw 24 is turned in order to set the tube in position. Under this condition, the end cap 7 again presses and opens the elastic valves 15 and 16 in order to admit the water in the passage 11 of the center conduit 1 into the new heat collector tube 2.

When there is any danger of freezing in the medium used for the solar system in accordance with the present invention, the discharge tube 302 of the lowermost unit A is opened in order to drain the medium and vacate the whole system.

In accordance with the present invention, the open end of the main tube of the heat collector tube made up of a pair of coaxially combined glass tubes is closed air tight by the end cap 7 having separate through holes 5 and 6, and a vacuum cylindrical space 8 is defined between the pair of glass tubes 3 and 4. Inlet and outlet ports for the medium are clearly separated by the through holes 5 and 6 in the end cap 7, both communication with the separate passages 11 and 12 in the center conduit 1. The effect accruing from use of such an end cap 7 with separate ports corresponds to that to be resulted from use of a U-shaped tube. In the case of a U-shaped solar heat collector tube, evacuation of the medium in the tube is greatly limited by the angular position of the tube. Whereas in the case of the solar heat collector tube in accordance with the present invention, a slight difference in level between the ports, i.e. the through holes 5 and 6, allows easy drainage of the medium in the tube.

In addition, since the open end of the heat collector tube is closed by the end cap 7 with separate holes 5 and 6, the diametrical lines or secants for the holes 5 and 6 of adjacent heat collector tubes 2 can be chosen with a phase difference in angular position. This enables compulsory circulation of the medium even when the solar system of the present invention is arranged on a flat place of a place with poor inclination. In addition, the solar system of the present invention can safely be used as a sort of the overflow-type heat collector.

In accordance with the present invention, the ports, i.e. the through holes 5 and 6, of the end cap 7 detachably communicate with the separate passages 11 and 12 of the center conduit 1, respectively, and elastic valves 15 and 16 are arranged at the junction of the heat collector tube 2 with the center conduit so that the valves close automatically when the force exerted by the heat collector tube 2 disappears. Consequently, accidental breakage of the collector tube 2 frees the elastic valves 15 and 16 from the force acting thereon and causes instant closing of these elastic valves, thereby successfully preventing undesirable leakage of the medium flowing through the center conduit 1. Thus, replacement of the broken heat collector tube can be carried out without any interruption to the operation of the remaining part of the solar system.

When a reservoir for the medium is located higher than the upper ends of the passage 11 and 12 in the center conduit 1 accompanied with a number of heat collector tubes 2 extending sidways therefrom, one can expect natural circulation of the medium through the whole system. Such a resevoir for the medium may be located lower than the unit or units when a pump is used for compulsory circulation of the medium. In addition, when the unit A is inclined in the direction of the center conduit 1, medium in the center conduit 1 can be easily drained merely by opening the lower side ends of the passages 11 and 12 communicating with the heat collector tubes 2. Thus, the danger of freezing of the medium can easily be obviated.

Figure 9:
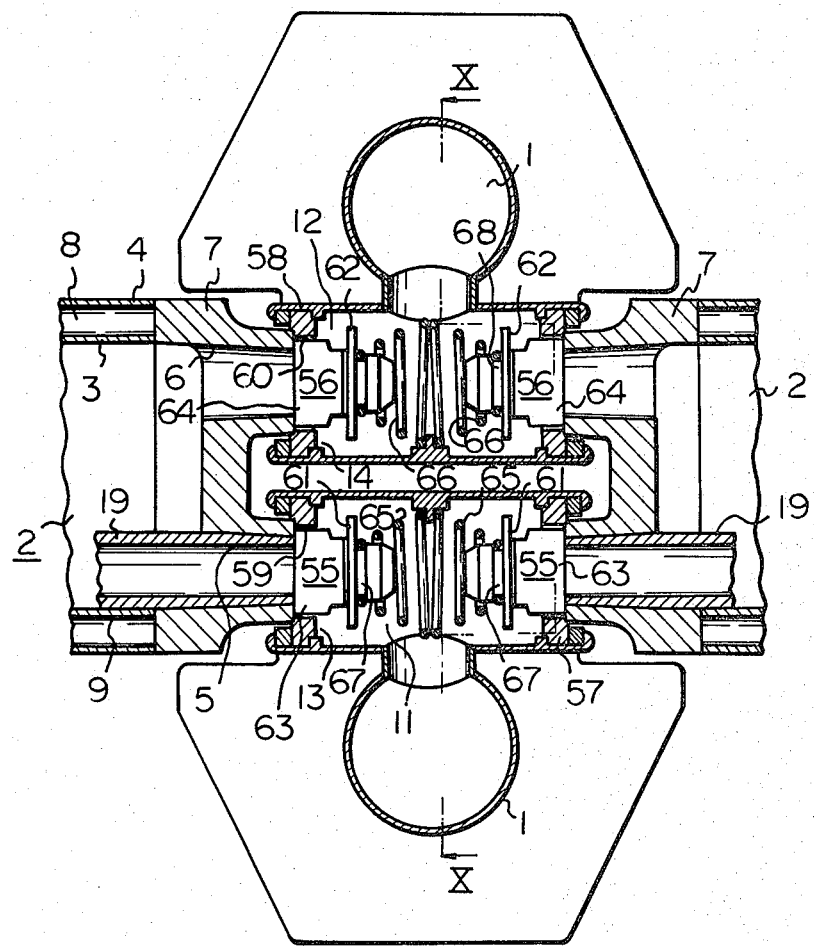
FIG. 9 is an enlarged transverse cross sectional view of another embodiment of the construction for connecting the center conduit to each pair of collector tubes used for the solar system unit shown in FIG. 1.
Figure 10:
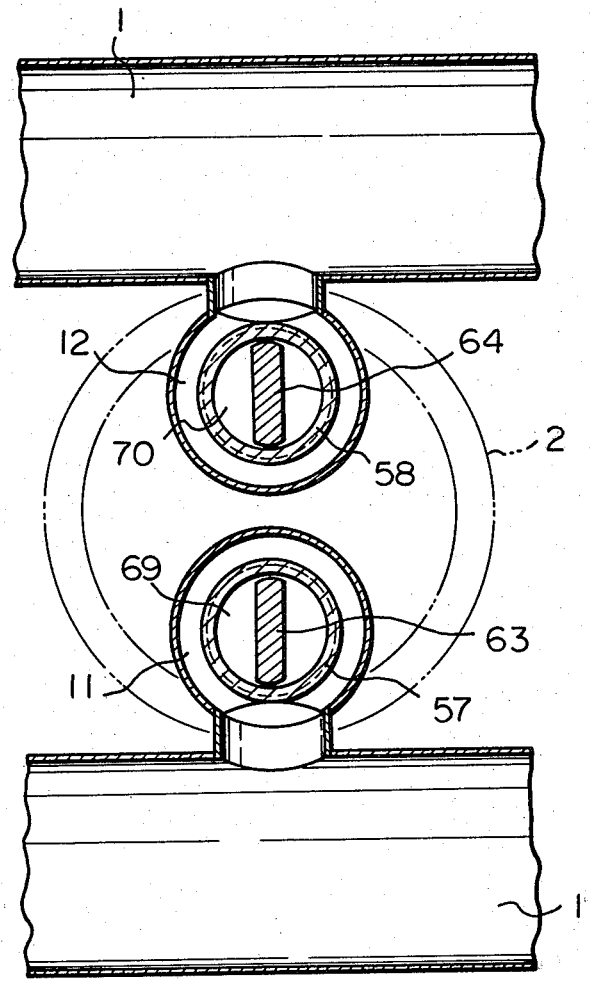
FIG. 10 is a section taken along the line X—X in FIG. 9.

Another embodiment of the construction for connecting the center conduit 1 to a pair of aligned collecor tubes 2 is shown in FIGS. 9 and 10. Like the arrangement shown in FIG. 5, the center conduit 1 is divided into a pair of vertically juxtaposed passages 11 and 12, the lower passage 11 being for the medium to be heated and the upper passage 12 being for the medium heated. The passages 11 and 12 are provided with 12 sets for each of side openings 13 and 14 so that each pair of side openings 13 and 14 meet the through holes 5 and 6 in the end cap 7 of each main tube made up of the glass tubes 3 and 4, respectively. In accordance with this embodiment, the collector tubes 2 communicate with the center conduit 1 via valve assemblies 55 and 56.

More specifically, each valve assembly 55 or 56 includes a gasket 57 or 58 attached liquid tight to the side opening 13 or 14 of the passage 11 or 12 in order to prevent leakage of the heating medium. The gaskets 57 and 58 should preferably be resistant to weather and heat. A valve 61 or 62 is axially slidably inserted into a through hole 59 or 60 formed in the gasket 57 or 58. A guide 63 or 64 extends axially from one side of the valve 61 or 62 into the through hole 59 or 60 whereas an annular groove 67 or 68 is formed in the valve 61 or 62 in order to hold, within the passage 11 or 12, one end of a compression spring 65 or 66. The other end of the compression spring 65 or 66 is firmly held within the passage 11 or 12 as shown in the drawing. In the case of the embodiment shown in FIG. 10, the guides 63 and 64 are rectangular in their transverse cross sectional profile in order to leave passages 69 and 70 for the heating medium within the through hole 59 or 60. They may be either cross-shaped or star-shaped as long as the guides 63 and 64 leave such passages for the heating medium around their bodies.

With the above-described construction of the valve assemblies 55 and 56, repulsion of the compression springs 65 and 66 located on the left in the illustration press the left side valves 55 and 56 leftwards against the left side collector tube 2 whereas repulsion of the compression springs 65 and 66 located on the right in the illustration press the right side valves 55 and 56 rightwards against the right side collector tube 2. When the collector tube 2 is coupled to the center conduit 1 as shown in FIG. 9, the initially open end of the collector tube 2 is brought into pressure contact with the sections of the gaskets 67 and 68 surrounding the through holes 59 and 60 for liquid tight sealing of the initially open end of the collector tube 2. Further, the initially open end of the collector tube 2 presses the ends of the guides 63 and 64 and forces the valves 61 and 62 to stay out of contact with the gaskets 67 and 68. As a consequence, via the passages 69 and 70 around the guides 63 and 64, communications are established between the passages 11 and 12 of the center conduit 1 and the interior of the collector tube 2.

In operation, just like the first embodiment, the cold water contained in the tank of reservoir flows into the passage 11 of the center conduit 1 via the taker-in tube 291 of the unit A and is introduced into the inner tube 3 via the valve assembly 55 and the pipe 19. The water so introduced into the heat collector tube 2 is heated by the solar heat transmitted through the outer and inner glass tubes 4 and 3 forming the main tube. Due to the high absorption for short light waves and low emanation for heat waves of the light absorptive coating 9 on the outer surface of the inner tube 3, more than 90% of the solar heat is effectively absorbed in order to heat the cold water in the inner tube 3 of the heat collector tube 2.

Further process for circulation of the water and heat exchange is same as that which takes place in the case of the first embodiment.

The valve assemblies 55 and 56 operate as follows when accidental breakage occurs on any heat collector tubes 2.

When the collector tube 2 is coupled to the center conduit 1 in the arrangement shown in FIG. 9, the valves 61 and 62 are forced, being pressed by the end cap 7, to stay out of pressure contact with the associated gaskets 67 and 68 whilst overcoming the repulsions of the compression springs 65 and 66. The valves 61 and 62 resume their pressure contact with the gaskets 67 and 68 due to repulsion of the compression springs 65 and 66 when released from pressing by the heat collector tube 2.

When either or both of the inner and outer tubes 3 and 4 are accidentally broken with the above-described construction, the force exerted on the valve assemblies 55 and 56 by the end cap 7 disappears so that repulsion of the compression springs 55 and 56 instantly forces the valves 61 and 62 to resume their pressure contact with the associated gaskets 57 and 58 in order to block leakage of the heating medium within the passages 11 and 12 of the center conduit 1. This, despite the accidental breakage on any heat collector tubes, the remaining system of the unit operates in the normal manner.

Replacement of the broken collector tubes is carried out in the same way as in the first embodiment.

In the case of the illustrated embodiments, the initially open end of the heat collector tube 2 is closed by the end cap 7 made of glass.

In an alternative embodiment, the end of the cylindrical space 8 closer to the center conduit 1 may be closed by fusing together the ends of the inner and outer glass tubes 3 and 4. In this case the end cap 7 is detachably inserted over the associated end of the heat collector tube and, as a consequence, may be made of materials other than glass such as metals, ceramics and plastics.

We claim:

1. A solar collector system comprising a conduit having a pair of adjacent channels, each channel having a port; a solar collector tube extending generally laterally from said conduit, said solar collector tube including an outer tube having an open end and a closed end, an inner tube having an open end and a closed end, said inner tube being arranged coaxially within said outer tube so as to form a space between said inner and outer tubes, and a cap positioned in said open ends of said inner and outer tubes, said cap including a first passageway extending between said inner tube and said port of one of said channels and a second passageway extending between said inner tube and said port of the other of said channels, whereby fluid in said conduit may be supplied to said inner tube through said first passageway and then returned to said conduit through said second passageway; controlling means for controlling the flow of fluid through said first and second passageways, said controlling means including a pair of valves, one of which is continuously and resiliently urged towards a closed position in which said one valve member prevents fluid flow through said port of said one channel and the other of which is continuously and resiliently urged towards a closed position in which said other valve member prevents fluid flow through said port of said other channel; and moving means for moving each of said valve members into an open position from its closed position, said moving means being disabled upon the breakage of said solar collector tube, whereby said valve members automatically assume their closed positions to inhibit the leakage of fluid from said conduit in the event that said solar collector tube breaks.

2. A solar collector system according to claim 1, wherein said one valve member includes a first guide movably positioned in said port of said one channel, a first seal attached to said first guide for movement therewith between an open position in which said first seal is spaced from said port of said one channel and a closed position in which said first seal abuts said port of said one channel, and first urging means for urging said first seal towards its closed position and said other valve member includes a second guide movably positioned in said port of said other channel, a second seal attached to said second guide for movement therewith between an open position in which said second seal is spaced from said port of said other channel and a closed position in which said second seal abuts said port of said other channel, and second urging means for urging said second seal towards its closed position.

3. A solar collector system according to claim 2, wherein said moving means includes a free end of said cap and holding means for releasably holding said free end of said cap in engagement with said first and second guides to maintain said first and second seals in their open positions.

4. A solar collector system according to claim 3, further comprising pushing means for automatically pushing said free end of said cap away from said first and second guides upon the breakage of said solar collector tube.

5. A solar collector system according to claim 1, wherein said one valve member includes a first elastic seal having lips which are movable between closed positions in which said lips of said first elastic seal cooperate with each other to prevent fluid flow through said port in said one channel and open positions in which said lips of said first elastic seal are spaced apart from each other to permit fluid flow through said port of said one channel, said lips of said first elastic seal having a elastic memory sufficient to cause said lips of said first elastic seal to automatically assume their closed positions, and said other valve member includes a second elastic seal having lips which are movable between closed positions in which said lips of said second elastic seal cooperate with each other to prevent fluid flow through said port of said other channel and open positions in which said lips of said second elastic seal are spaced apart from each other to permit fluid flow through said port of said other channel, said lips of said second elastic seal having an elastic memory sufficient to cause said lips of said second elastic seal to automatically assume their closed positions.

6. A solar collector system according to claim 5, wherein said moving means includes a free end of said cap and holding means for releasably holding said free end of said cap in engagement with said lips of said first and second elastic seals to manitain said lips of said first and second elastic seals in their open positions.

7. A solar collector system according to claim 6, further comprising pushing means for automatically pushing said free end of said cap away from said lips of said first and second elastic seals upon the breakage of said solar collector tube.

8. A solar collector system according to claim 1, 4 or 7, wherein said inner tube has an outer surface which is covered with an absorptive coating which provides high absorption for light of wavelengths within the solar spectrum and low emission of higher wavelengths of light.

9. A solar collector system according to claim 1, 4 or 7, wherein said cap is made from glass.

10. A solar collector system according to claim 1, 4 or 7, wherein said cap is made from metal.

11. A solar collector system according to claim 1, 4 or 7, wherein said cap is made from ceramic.

12. A solar collective system according to claim 1, 4 or 7, wherein said cap is made from plastic.

13. A solar collector system according to claim 1, 4 or 7, wherein said inner and outer tubes are made of glass and said space between said inner and outer tubes is a vacuum.

14. A solar collector system according to claim 1, 4 or 7, wherein said outer tube has a plurality of projections abutting said inner tube so as to maintain said space between said outer and inner tubes.

15. A solar collector system according to claim 1, 4 or 7, wherein said solar collector tube includes a pipe extending within said inner tube, said pipe having a first open end connected to said first passageway in said cap and a second open end positioned near said closed end of said inner tube.

16. A solar collector system according to claim 1, 4 or 7, wherein a plurality of solar collector tubes are arranged on one side of said conduit.

17. A solar collector system according to claim 1, 4 or 7, wherein a plurality of solar collector tubes are arranged along both sides of said conduit.

* * * * *